(12) United States Patent
Serizawa et al.

(10) Patent No.: US 8,586,658 B2
(45) Date of Patent: *Nov. 19, 2013

(54) POLYLACTIC ACID RESIN COMPOSITION AND MOLDED ITEM

(75) Inventors: Shin Serizawa, Tokyo (JP); Tsunenori Yanagisawa, Tokyo (JP); Kazuhiko Inou, Tokyo (JP); Masatoshi Iji, Tokyo (JP); Yohei Kabashima, Uji (JP); Kazue Ueda, Uji (JP); Hiroo Kamikawa, Uji (JP); Norio Fukawa, Uji (JP)

(73) Assignees: NEC Corporation, Tokyo (JP); Unitika, Ltd., Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/279,529

(22) PCT Filed: Feb. 13, 2007

(86) PCT No.: PCT/JP2007/052897
§ 371 (c)(1),
(2), (4) Date: Aug. 14, 2008

(87) PCT Pub. No.: WO2007/094477
PCT Pub. Date: Aug. 23, 2007

(65) Prior Publication Data
US 2009/0069463 A1 Mar. 12, 2009

(30) Foreign Application Priority Data
Feb. 14, 2006 (JP) ................................ 2006-035892

(51) Int. Cl.
*C08K 5/05* (2006.01)
*C08K 5/09* (2006.01)
*C08K 5/19* (2006.01)

(52) U.S. Cl.
USPC ............................ 524/220; 524/210; 524/283

(58) Field of Classification Search
USPC ...................................... 524/9, 210, 220, 283
See application file for complete search history.

(56) References Cited

U.S. PATENT DOCUMENTS

| 6,482,341 | B1 * | 11/2002 | Jongboom et al. ............... 264/50 |
| 7,265,160 | B2 | 9/2007 | Oka et al. |
| 7,498,457 | B2 | 3/2009 | Schafter |
| 2004/0180990 | A1 * | 9/2004 | Suzuki et al. .................. 523/216 |
| 2004/0242803 | A1 * | 12/2004 | Ohme et al. .................. 525/400 |
| 2005/0001358 | A1 * | 1/2005 | Nakazawa et al. ....... 264/331.18 |
| 2005/0032923 | A1 | 2/2005 | Oka et al. |
| 2007/0112107 | A1 * | 5/2007 | Yamashita et al. ............. 524/115 |
| 2007/0244342 | A1 | 10/2007 | Schafter |

FOREIGN PATENT DOCUMENTS

| JP | 3411168 | 3/2003 |
| JP | 2003-128901 | 5/2003 |
| JP | 2003-226801 | 8/2003 |
| JP | 2005-060474 | * 3/2005 ............. C08L 67/00 |
| JP | 2005-105245 | 4/2005 |
| JP | 2005-281331 | 10/2005 |
| JP | 2008-508231 | 3/2008 |
| WO | 03/046060 | 6/2003 |
| WO | 2005/075564 | 8/2005 |
| WO | WO 2006/132187 | 12/2006 |

OTHER PUBLICATIONS

Machine translation of JP 2005-060474.*
Machine translation of JP 2003-128901.*
JP Office Action dated Oct. 10, 2012, with English translation; Application No. 2008-500577.

* cited by examiner

*Primary Examiner* — John Uselding
(74) *Attorney, Agent, or Firm* — Young & Thompson

(57) ABSTRACT

Provided is a polylactic acid resin composition obtained by adding a carboxylic acid amide and a carboxylic acid ester each of which has at least one polar group in a molecule to a polylactic acid resin reacted with a (meth)acrylate compound. Also provided is a polylactic acid resin molded article which is a molded article obtained by molding the polylactic acid resin composition, manufactured by setting a mold temperature to a glass transition temperature of a polylactic acid resin plus 20° C. or higher and a melting point thereof minus 20° C. or lower, at the time of injection molding the polylactic acid resin composition. Thus, a resin composition in which a moldability is improved at a temperature at which a polylactic acid resin is crystallized, and a molded article therefrom are provided.

16 Claims, No Drawings

POLYLACTIC ACID RESIN COMPOSITION AND MOLDED ITEM

TECHNICAL FIELD

This invention relates to a polylactic acid resin composition and a molded item or article using the polylactic acid resin composition.

BACKGROUND ART

In recent years, resins formed of plant-derived materials have been drawing attention from the viewpoint of environmental conservation. Among the resins formed of plant-derived materials, polylactic acid is one of the resins having the highest heat resistance and capable of mass production, so polylactic acid can be obtained at a low cost and is highly useful. The recent applications thereof varies widely from applications having short period of service time based on an assumption that the resin will be discarded, e.g., a container and packing and an agricultural film, to highly functional applications which can retain initial properties for a long period of time, e.g., housings of home electric appliances and OA equipment and automobile parts.

Polylactic acid is a crystalline resin, and it is important that the resin be crystallized in order to exhibit the original material properties thereof, such as heat resistance. However, polylactic acid has a low crystallization rate, so the crystallization thereof does not proceed sufficiently when molded in a short period of time and has tendencies that the heat resistance, elastic modulus, and the like thereof decrease.

Accordingly, as a method of improving the moldability of polylactic acid, a method of increasing the crystallization rate of polylactic acid has been proposed. For example, in Japanese Patent No. 3411168 (Patent Document 1), it is described that a molded article retaining its transparency and crystrallizability can be obtained by adding a transparent nucleating agent such as aliphatic amide to aliphatic polyesters, such as polylactic acid.

Further, Japanese Unexamined Patent Application Publication No. 2003-226801 (Patent Document 2) describes that the crystallization rate of polylactic acid is significantly increased by adding a low molecular compound having an amide group and a layered clay mineral organized with an organic onium salt to polylactic acid.

Further, in order to increase the crystallization rate, a method of adding a (meth)acrylate compound to polylactic acid is also disclosed (for example, see Japanese Unexamined Patent Application Publication No. 2003-128901 (Patent Document 3)).

When the transparent nucleating agent, such as aliphatic amide, exemplified in Patent Document 1 is added to polylactic acid, an increase in crystallization rate of polylactic acid can be observed compared with the case of an additive-free polylactic acid. However, the effect of the addition is not sufficient, therefore, in order to obtain a molded article having a sufficient crystallinity, a heat treatment after molding is required. Further, because a crystallinity of polylactic acid is low, the crystal solidification in a mold at the time of, for example, injection molding, is tend to be insufficient. As a result, there are some defects such that the molded article is deformed at the time of mold releasing.

Further, when a low molecular compound having amide group and a layered clay mineral organized with an organic onium salt disclosed in Patent Document 2 are added to polylactic acid, an increase in crystallization rate and an improvement in moldability of polylactic acid can be observed compared with the cases of the additive-free polylactic acid and polylactic acid being added with the nucleating agent such as aliphatic amide, but the effects thereof are insufficient. Further, in the resin composition described in Patent Document 3, the crystallization rate is increased, but the effects thereof are not necessarily sufficient in some cases.

DISCLOSURE OF THE INVENTION

Problems to be Solved by the Invention

An object of the present invention is accomplished in view of the problems inherent in the above-mentioned conventional technology, and to provide a polylactic acid resin composite material having an excellent moldability at a crystallization temperature of the polylactic acid resin, and a molded article using the same.

Means to Solve the Problems

The inventors of the present invention have intensively studied to solve the above problems. As a result, they have completed a polylactic acid composite material of the present invention in which the moldability thereof is being remarkably improved compared with that of the conventional material, at the time of molding the polylactic acid resin at the temperature at which the polylactic acid resin is crystallized, by adding a carboxylic acid amide and a carboxylic acid ester each of which has a polar group in a molecule to a polylactic acid resin reacted with a (meth)acrylate compound. In addition, they have also found that the moldability of the polylactic acid resin is further improved by adding a fiber thereto.

That is, according to an aspect of the present invention, there is provided a polylactic acid resin composition including a polylactic acid resin reacted with a (meth)acrylate compound and at least one kind of low molecular compound selected from a carboxylic acid amide and a carboxylic acid ester each of which has a polar group in a molecule. Here, in the present invention, each of an acrylate compound and a methacrylate compound is collectively referred to as a (meth) acrylate compound.

Further, in the polylactic acid resin composition of the present invention, it is preferable that the polar group preferably includes at least one kind of group selected from the group consisting of an oxygen-containing substituent, a nitrogen-containing substituent, and a halogen group.

Further, in the polylactic acid resin composition of the present invention, it is preferable that the polar group preferably includes at least one kind of group selected from the group consisting of a hydroxyl group, a glycidyl group, a carboxyl group, an amino group, a nitro group, a cyano group, and an isocyanate group.

Further, in the polylactic acid resin composition of the present invention, it is preferable that the low molecular compound preferably includes an ethylenebis-12-hydroxystearic acid amide.

Further, in the polylactic acid resin composition of the present invention, it is preferable that the polylactic acid resin composition preferably contains 100 parts by mass or less of a fiber with respect to 100 parts by mass of the polylactic acid resin, and it is more preferable that the fiber include at least one kind of fiber selected from a plant-derived fiber, a synthetic organic fiber, and an inorganic fiber, or the fiber have an average fiber length of 80 μm to 3 mm after being mixed with the polylactic acid resin.

Further, according to another aspect of the present invention, there is provided a polylactic acid resin molded article, which is obtained by molding a polylactic acid resin composition, in which the polylactic acid resin composition includes a polylactic acid resin reacted with a (meth)acrylate compound and at least one kind of low molecular compound selected from a carboxylic acid amide and a carboxylic acid ester each of which has a polar group in a molecule.

Here, in the polylactic acid resin molded article of the present invention, it is preferable that the polar group preferably includes at least one kind of functional group selected from the group consisting of an oxygen-containing substituent, a nitrogen-containing substituent, and a halogen group.

Further, in the polylactic acid resin molded article of the present invention, it is preferable that the polar group preferably includes at least one kind of group selected from the group consisting of a hydroxyl group, a glycidyl group, a carboxyl group, an amino group, a nitro group, a cyano group, and an isocyanate group.

Further, in the polylactic acid resin molded article of the present invention, it is preferable that the low molecular compound preferably includes an ethylenebis-12-hydroxystearic acid amide.

Further, in the polylactic acid resin molded article of the present invention, it is preferable that the polylactic acid resin composition preferably contains 100 parts by mass or less of a fiber with respect to 100 parts by mass of the polylactic acid resin, and it is more preferable that the fiber include at least one kind of fiber selected from a plant-derived fiber, a synthetic organic fiber, and an inorganic fiber, or the fiber have an average fiber length of 80 μm to 3 mm after being mixed with the polylactic acid resin.

Further, according to another aspect of the present invention, there is provided a method of manufacturing a polylactic acid resin molded article, including setting a mold temperature to a glass transition temperature of a polylactic acid resin plus 20° C. or higher and a melting point thereof minus 20° C. or lower, at the time of injection molding a polylactic acid resin composition including a polylactic acid resin reacted with a (meth)acrylate compound and at least one kind of low molecular compound selected from a carboxylic acid amide and a carboxylic acid ester each of which has a polar group in a molecule.

Here, in the method of manufacturing a polylactic acid resin molded article according to the present invention, it is preferable that the polar group preferably includes at least one kind of group selected from the group consisting of an oxygen-containing substituent, a nitrogen-containing substituent, and a halogen group.

Further, in the method of manufacturing a polylactic acid resin molded article according to the present invention, it is preferable that the polar group preferably includes at least one kind of group selected from the group consisting of a hydroxyl group, a glycidyl group, a carboxyl group, an amino group, a nitro group, a cyano group, and an isocyanate group.

Further, in the method of manufacturing a polylactic acid resin molded article according to the present invention, it is preferable that the at least one kind of low molecular compound selected from a carboxylic acid amide and a carboxylic acid ester each of which has a polar group in a molecule preferably includes an ethylenebis-12-hydroxystearic acid amide.

Further, in the method of manufacturing a polylactic acid resin molded article according to the present invention, it is preferable that the polylactic acid resin composition preferably contains 100 parts by mass or less of a fiber with respect to 100 parts by mass of the polylactic acid resin, and it is more preferable that the fiber include at least one kind of fiber selected from a plant-derived fiber, a synthetic organic fiber, and an inorganic fiber or the fiber have an average fiber length of 80 μm to 3 mm after being mixed with the polylactic acid resin.

Effect of the Invention

As an effect of this invention, a polylactic acid resin composition that gives a molded article which is unlikely to be deformed even when molded in a short period of time and a molded article of a polylactic acid resin are provided.

BEST MODE FOR EMBODYING THE INVENTION

Hereinafter, embodiments of the present invention are described in detail.

A polylactic acid resin composition of the present invention has a constitution which includes a polylactic acid resin reacted with a (meth)acrylate compound and at least one kind of low molecular compound selected from a carboxylic acid amide and a carboxylic acid ester each of which has a polar group in a molecule.

Further, a polylactic acid resin molded article or part of the present invention is a molded article which is obtained by molding the polylactic acid resin composition.

Further, a method of manufacturing the polylactic acid resin molded article of the present invention includes setting a mold temperature to a glass transition temperature of a polylactic acid resin composition plus 20° C. or higher and a melting point thereof minus 20° C. or lower, at the time of injection molding the polylactic acid resin composition.

Specifically, the polylactic acid resin composition of the present invention is a composition in which a carboxylic acid amide and a carboxylic acid ester each of which has a polar group in a molecule are added to a polylactic acid resin reacted with a (meth)acrylate compound.

Further, the polylactic acid resin composition of the present invention contains a kenaf fiber and other fibers.

As the polylactic acid resin of the present invention, poly (L-lactic acid), poly(D-lactic acid), and a mixture thereof or a copolymer thereof may be used.

In the present invention, a melt flow rate of the polylactic acid resin at 190° C. under a load of 21.2 N (e.g., a value according to JIS standard K-7210 (condition D of Table 1, Appendix A)) is preferably 0.1 to 50 g/10 minutes, and more preferably 0.2 to 30 g/10 minutes. In the case where the melt flow rate exceeds 50 g/10 minutes, a melt viscosity of the polylactic acid resin is too low and a mechanical strength and a heat resistance of the molded article become poor. In the case where the melt flow rate is less than 0.1 g/10 minutes, a load to the polylactic acid resin at the time of molding process becomes too high and an operability of the polylactic acid resin may be decreased.

The polylactic acid resin is generally manufactured by a known melt polymerization method, or by combined use of a solid phase polymerization method therewith. Further, as methods of adjusting the melt flow rate of the polylactic acid resin within a predetermined range, in the case where the melt flow rate is too high, a method of increasing the molecular weight of the polylactic acid resin by using a small amount of chain length extender such as a diisocyanate compound, a bisoxazoline compound) an epoxy compound, and an acid anhydride is mentioned. On the contrary, in the case where the melt flow rate is too low, a method of mixing a polyester resin or a low molecular weight compound, each of which has a high melt flow rate, with the polylactic acid resin can be mentioned.

A content ratio of one of an L-lactic acid unit and a D-lactic acid unit, which are the constituent components of the polylactic acid resin, is preferably 85 mol % or more, more preferably 90 mol % or more, still more preferably 95 mol % or more, and particularly preferably 98 mol % or more. When the D-lactic acid unit or the L-lactic acid unit is less than 85 mol %, there is a tendency that an effect to be obtained is not expressed sufficiently owing to a decrease in stereoregularity.

An amount of residual monomers such as lactic acid and lactide contained in the polylactic acid resin is preferably 0.6 parts by mass or less with respect to 100 parts by mass of the polylactic acid resin. When the amount of residual monomers exceeds 0.6 parts by mass, a hydrolysis resistance of the polylactic acid resin may be decreased.

A plurality of the polylactic acid resins, each of which has different proportions of the L-lactic acid unit and the D-lactic acid unit with each other, may be blended together at any appropriate ratio and used.

A monomer except for lactic acid which is a main component may be copolymerized with the polylactic acid resin, and preferably copolymerized in an amount of preferably 30 mass % or less. For example, as an acid component, there are given: aromatic dicarboxylic acids, such as terephthalic acid, isophthalic acid, orthophthalic acid, 2,6-naphthalene dicarboxylic acid, 2,5-naphthalene dicarboxylic acid, 2,7-naphthalene dicarboxylic acid, 1,5-naphthalene dicarboxylic acid, methyl terephthalate, 4,4'-biphenyl dicarboxylic acid, 2,2'-biphenyl dicarboxylic acid, 4,4'-biphenyl ether dicarboxylic acid, 4,4'-diphenylmethane dicarboxylic acid, 4,4'-diphenylsulfone dicarboxylic acid, and 4,4'-diphenylisopropylidene dicarboxylic acid; saturated aliphatic dicarboxylic acids such as adipic acid, sebacic acid, oxalic acid, malonic acid, succinic acid, azelaic acid, undecanedioic acid, dodecanedioic acid, icosanedioic acid, and hydrogenated dimer acid; unsaturated aliphatic dicarboxylic acids, such as fumaric acid, maleic acid, itaconic acid, mesaconic acid, citoraconic acid, and dimer acid, and anhydrides thereof; and alicyclic dicarboxylic acids, such as 1,4-cyclohexane dicarboxylic acid, 1,3-cyctohexane dicarboxylic acid, 1,2-cyclohexane dicarboxylic acid, 2,5-norbornene dicarboxylic acid, and tetrahydrophthalic acid. In addition, as a diol component, an aliphatic diol such as ethylene gycol, propylene glycol, 1,3-butane diol, diethylene glycol, neopentyl glycol, 1,5-pentane diol, 1,6-hexane diol, 1,8-octane diol, or 1,10-decane diol; an alicyclic diol such as 1,4-cyclohexane dimethanol, 1,3-cyclohexane dimethanol, or 1,2-cyclohexane dimethanol; a bisphenol, such as bisphenol A or bisphenol S, or an ethylene oxide adduct thereof; or an aromatic diol such as hydroquinone or resorcinol may be copolymerized.

In addition, a hydroxycarboxylic acid such as p-hydroxybenzoic acid, p-(2-hydroxyethoxy)benzoic acid, 6-hydroxycaproic acid, 3-hydroxybutanoic acid, or 3-hydroxyvaleric acid, or a lactone compound such as δ-valerolactone, γ-butyrolactone, or ε-caprolactone may be copolymerized. In addition, in order to impart flame retardancy, an organic phosphorous compound may be copolymerized.

In the polylactic acid resin component, another polyester resin, such as polyethylene terephthalate, polycarbonate, polyarylate, polycyclohexylene dimethylene terephthalate, polyethylene naphthalate, polybutylene naphthalate, polyethylene isophthalate/terephthalate, polybutylene isophthalate/terephthalate, polyethylene terephthalate/cyclohexylene dimethylene terephthalate, polycyclohexylene dimethylene isophthalate/terephthalate, poly(p-hydroxybenzoic acid/ethylene terephthalate), or polytetramethylene terephthalate may be mixed. Those components are mixed in an amount of preferably 30 mass % or less with respect to 100 mass % of the polylactic acid resin.

The (meth)acrylate compound to be used in the present invention is reacted with the polylactic acid resin, and imparts a branched structure, a crosslinking structure, a chain length extension, and the like to the resin. As a result, a melt tension of the resin increases, and the moldability thereof is further improved. When at least one of the carboxylic acid amide and the carboxylic acid ester each of which has a polar group in a molecule, is added to the polylactic acid resin reacted with the (meth)acrylate compound, in addition to the improvement in the moldability owing to the increased melt tension, a different mechanism of crystallization promotion proceeds simultaneously, compared with the case where one of the (meth)acrylate compound and the carboxylic acid amide or the carboxylic acid ester is used alone. Consequently, a molding cycle is shortened, and it is considered that the fact leads to the improvement in moldability such that poses no problems in extracting the molded article even in the same molding cycle and to the increase in heat resistance.

As the (meth)acrylate compound used in the present invention, preferably, a compound having two or more (meth) acrylic groups, or a compound having one or more (meth) acrylic group(s) and one or more glycidyl group(s) or vinyl group(s) in the molecule is given because such components have high reactivity with the polylactic acid resin, whereby a monomer hardly remains and the resin is unlikely colored. Specific examples thereof include glycidyl methacrylate, glycidyl acrylate, glycerol dimethacrylate, trimethylolpropane trimethacrylate, trimethylolpropane triacrylate, allyloxypolyethylene glycol monoacrylate, allyloxypolyethylene glycol monomethacrylate, polyethylene glycol dimethacrylate, polyethylene glycol diacrylate, polypropylene glycol dimethacrylate, polypropylene glycol diacrylate, polytetramethylene glycol dimethacrylate (alkylene glycol moieties thereof may be copolymers of alkylene having various lengths), butanediol methacrylate, and butanediol acrylate. Of those, polyethylene glycol dimethacrylate, polypropylene glycol dimethacrylate, ethylene glycol dimethacrylate, and diethylene glycol dimethacrylate are preferred for safety and reactivity.

An amount of the (meth)acrylate compound to be used in the present invention is preferably 0.01 to 20 parts by mass, more preferably 0.01 to 10 parts by mass, and still more preferably 0.01 to 3 parts by mass with respect to 100 parts by mass of the polylactic acid resin. When the amount is less than 0.01 part by mass, the increase in crystallization rate, which is an object of the present invention, is not sufficient, and thus the heat resistance and the moidability cannot be obtained. When the amount exceeds 20 parts by mass, the degree of reaction becomes too high, which may lead to a trouble in operability.

The polylactic acid resin reacted with the (meth)acrylate compound of the present invention may be mixed with a polylactic acid resin which is unreacted with the (meth)acrylate compound, and the amount of the polylactic acid resin which is unreacted with the (meth)acrylate compound is preferably 100 parts by mass or less, and particularly preferably 50 parts by mass or less with respect to 100 parts by mass of the polylactic acid resin reacted with the (meth)acrylate compound. When the amount of the polylactic acid resin which is unreacted is 50 parts by mass or less, the moldability of the composition part can be retained further satisfactorily.

In the present invention, a peroxide as a reaction assistant is preferably added concurrently with the (meth)acrylate compound. As the peroxide, an organic peroxide which has a satisfactory dispersibility in the resin is preferable. Specific examples thereof include benzoyl peroxide, bis(butylperoxy) trimethylcyclohexane, bis(butylperoxy)methylcyclododecane, butylbis(butylperoxy)valerate, dicumyl peroxide, butylperoxybenzoate, dibutyl peroxide, bis(butylperoxy)diisopropylbenzene, dimethyldi(butylperoxy)hexane, dimethyldi(butylperoxy)hexyne, and butyl peroxycumene. A compounding amount of the peroxide is preferably 0.02 to 20 parts by mass, and more preferably 0.1 to 10 parts by mass with respect to 100 parts by mass of the polylactic acid resin. When the compounding amount is less than 0.1 part by mass, the effect of increasing the reactivity is low, and when the compounding amount exceeds 20 parts by mass, it is not preferable in terms of cost.

In order to block a terminal group of the polylactic acid resin component to increase a humidity-heat resistance, an impact resistance, and the like, one or more kinds of compounds selected from carbodiimide compounds may be combined with the polylactic acid resin composition of the present invention. A compounding range of the carbodiimide compound is 0.5 to 20 parts by mass, more preferably 1 to 10 parts by mass, and particularly preferably 1 to 3 parts by mass with respect to 100 parts by mass of the polylactic acid resin. When the compounding amount is less than 0.5 parts by mass, any effects on mechanical physical properties such as the humidity-heat resistance and the impact resistance of the resin composition of the present invention cannot be observed. On the other hand, when the compounding amount exceeds 20 parts by mass, no further effects can be expected.

The carbodiimide compound is not particularly limited as long as the compound has one or more carbodiimide group(s) in the molecule. Examples thereof include N,N'-di-2,6-diisopropylphenylcarbodiimide, N,N'-di-o-tolylcarbodiimide, N,N'-diphenylcarbodiimide, N,N'-dioctyldecylcarbodiimide, N,N'-di-2,6-dimethylphenylcarbodiimide, N-tolyl-N'-cyclohexylcarbodiimide, N,N'-di-2,6-di-tert.-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide, N,N'-di-p-tolylcarbodiimide, p-phenylene-bis-di-o-tolylcarbodiimide, p-phenylene-bis-dicyclohexylcarbodiimide, hexamethylene-bis-dicyclohexylcarbodiimide, 4,4'-dicyclohexylmethanecarbodiimide, ethylene-bis-diphenylcarbodiimide, N,N'-benzylcarbodiimide, N-octadecyl-N'-phenylcarbodiimide, N-benzyl-N'-phenylcarbodiimide, N-octadecyl-N'-tolylcarbodiimide, N-cyclohexyl-N'-tolylcarbodiimide, N-phenyl-N'-tolylcarbodiimide, N-benzyl-N'-tolylcarbodiimide, N,N'-di-o-ethylphenylcarbodiimide, N,N'-di-p-ethylphenylcarbodiimide, N,N'-di-o-isopropylphenylcarbodiimide, N,N'-di-p-isopropylphenylcarbodiimide, N,N'-di-o-isobutylphenylcarbodiimide, N,N'-di-p-isobutylphenylcarbodiimide, N,N'-di-2,6-diethylphenylcarbodiimide, N,N'-di-2-ethyl-6-isopropylphenylcarbodiimide, N,N'-di-2-isobutyl-6-isopropylphenylcarbodiimide, N,N'-di-2,4,6-trimethylphenylcarbodiimide, N,N'-di-2,4,6-triisopropylphenylcarbodiimide, N,N'-di-2,4,6-triisobutylphenylcarbodiimide, diisopropylcarbodiimide, dimethylcarbodiimide, diisobutylcarbodiimide, dioctylcarbodiimide, t-butylisopropylcarbodiimide, di-β-naphthylcarbodiimide, di-t-butylcarbodiimide, and aromatic polycarbodiimides. Further, polymers thereof can be exemplified. Those carbodiimide compounds may be used alone or two or more kinds thereof may be used in combination. In the present invention, aromatic carbodiimide, particularly N,N'-di-2,6-diisopropylphenylcarbodiimide, and a polymer of the compounds thereof (degree of polymerization thereof is desirably about 2 to 20) are desirably used. In addition, a carbodiimide compound having a cyclohexane ring, particularly 4,4'-dicyclohexylmethanecarbodiimide, and a polymer of the compounds thereof (degree of polymerization thereof is desirably about 2 to 20) are particularly preferably used. The carbodiimide compound can be produced by conventionally known methods, for example, by a carbodiimide reaction which accompanies decarboxylation reaction using a diisocyanate compound as a material. At that time, a carbodiimide compound having an isocyanate group at a terminal end can be obtained unless a terminal blocking treatment with monoisocyanate or the like is performed. A concentration of an isocyanate group is not particularly limited. A specific example of the compound includes LA-1 manufactured by Nisshinbo Industries, Inc. (aliphatic carbodiimide compound including 1 to 3% isocyanate group), which is commercially available.

Another petroleum-derived resin may be mixed to the polylactic acid resin composition of the present invention. Examples of the petroleum-derived resins include: thermoplastic resins such as polypropylene, ABS, and nylon; and thermosetting resins such as a phenol resin, a silicone resin, and a furan resin.

The carboxylic acid amide and the carboxylic acid ester each of which has a polar group in a molecule and works as an organic crystal nucleating agent according to the present invention are compounds each having molecular weights of 1,000 or less, and more preferably 100 to 900. When the molecular weight of each of the compounds exceeds 1,000, the compatibility with the polylactic acid resin decreases, and thus the dispersibility of the compounds may be decreased or the compounds may bleed out from the molded article. As the organic crystal nucleating agent, one kind of compound may be used alone or two or more kinds thereof may be used in mixture.

As a main skeleton of the carboxylic acid amide, an aliphatic monocarboxylic acid amide, an aliphatic biscarboxylic acid amide, or an aromatic carboxylic acid amide can be mentioned, and as the carboxylic acid ester, an aliphatic monocarboxylate, an aliphatic biscarboxylate, or an aromatic carboxylate can be mentioned. The number of the amide group or the ester group contained in each of the compounds may be one or two or more. Of those, the compounds containing the amide group are preferable, because they have higher melting point than the case of the compounds containing the ester group, and can rapidly generate the crystal nuclei which causes a crystallization of the polylactic acid resin to occur at the time of molding the polylactic acid resin composition of the present invention. In addition, a bisamide is particularly preferable in the point of enabling an increase in the crystallization rate.

Specific examples of compound of aliphatic monocarboxylic acid amides, aliphatic biscarboxylic acid amides, and aromatic carboxylic acid amides, include lauric acid amide, palmitic acid amide, oleic acid amide, stearic acid amide, erucic acid amide, N-oleylpalmitic acid amide, N-oleyloleic acid amide, N-oleyistearic acid amide, N-stearyloleic acid amide, N-stearyistearic acid amide, N-stearylerucic acid amide, methylenebisstearic acid amide, ethylenebislauric acid amide, ethylenebiscapric acid amide, ethylenebisoleic acid amide, ethylenebisstearic acid amide, ethylenebiserucic acid amide, ethylenebisisostearic acid amide, butylenebisstearic acid amide, and p-xylylenebisstearic acid amide.

Specific examples of aliphatic monocarboxylate, aliphatic biscarboxylate, and aromatic carboxylate include laurate, palmitate, oleate, stearate, erucate, N-oleyl palmitate, N-oleyl oleate, N-oleyl stearate, N-stearyl oleate, N-stearyl stearate, N-stearyl erucate, methylenebisstearate, ethylenebislaurate, ethylenebiscaprate, ethylenebisoleate, ethylenebisstearate, ethylenebiserucate, ethylenebisisostearate, butylenebisstearate, and p-xylylenebisstearate.

As a polar group contained in the carboxylic acid amide and the carboxylic acid ester of the present invention, any group may be employed as long as it is selected from an oxygen-containing substituent, a nitrogen-containing substituent, and a halogen group. The low molecular compound of the present invention contains preferably at least two of those polar groups, and an interval between any two polar groups is preferably 34±4 Å (that is, 3.4±0.4 nm). The interval between two polar groups indicates a direct distance between carbon atoms each to which the polar group is bound in the state where the whole molecule is most stretched while each atom constituting the whole molecule is satisfying a known bond angle at each bonding. The number of polar groups contained in the compounds may be three or more. Further, as for kinds of the polar groups, more specifically, the oxygen-containing substituent includes a hydroxyl group, a glycidyl group, and a carboxyl group, and the nitrogen-containing substituent includes an amino group, a nitro group, a cyano group, and an isocyanate group. Further, different kinds of polar groups may be contained in one molecule. Note that, in the case where the kinds of the polar groups contained in a molecule structure is two or more and in the case where the number of the polar groups is three or more, from an influence of chemical interaction between the polar groups, the compound may function preferably also when an interval between two polar groups selected from the above is in a range of 34±10 Å (that is, 3.4±1.0 nm) in the state where the whole molecule is most stretched while each atom constituting the whole molecule is satisfying a known bond angle at each bonding.

It should be noted that "substitution" according to the present invention means that a hydrogen atom bound to a carbon atom in the molecule which does not have a polar group is substituted.

As the carboxylic acid amide and the carboxylic acid ester having the preferable conditions, in which a part of molecule is substituted with a polar group, for example, there are given ethylenebis-12-hydroxystearic acid amide, hexamethylenebis-10-hydroxystearic acid amide, hexamethylenebis-9,10-dihydroxystearic acid amide, p-xylylenebis-9,10-dihydroxystearic acid amide, p-xylylenebis-11,12-dihydroxystearic acid amide, ethylenebis-12-aminostearic acid amide, hexamethylenebis-10-aminostearic acid amide, hexamethylenebis-9,10-diaminostearic acid amide, p-xylylenebis-9,10-diaminostearic acid amide, p-xylylenebis-11,12-diaminostearic acid amide, ethylenebis-12-cyanostearic acid amide, hexamethylenebis-10-cyanostearic acid amide, hexamethylenebis-9,10-dicyanostearic acid amide, p-xylylenebis-9,10-dicyanostearic acid amide, p-xylylenebis-11,12-dicyanostearic acid amide, ethylenebis-12-glycidylstearic acid amide, hexamethylenebis-10-glycidylstearic acid amide, hexamethylenebis-9,10-diglycidyl stearic acid amide, p-xylylenebis-9,10-diglycidylstearic acid amide, p-xylylenebis-11,12-diglycidylstearic acid amide, ethylenebis-12-hydroxystearate, hexamethylenebis-10-hydroxystearate, hexamethylenebis-9,10-dihydroxystearate, p-xylylenebis-9,10-dihydroxystearate, p-xylylenebis-11,12-dihydroxystearate, ethylenebis-12-aminostearate, hexamethylenebis-10-aminostearate, hexamethylenebis-9,10-diaminostearate, p-xylylenebis-9,10-diaminostearate, p-xylyienebis-11,12-diaminostearate, ethylenebis-12-cyanostearate, hexamethylenebis-10-cyanostearate, hexamethylenebis-9,10-dicyanostearate, p-xylylenebis-9,10-dicyanostearate, p-xylylenebis-11,12-dicyanostearate, ethylenebis-12-glycidylstearate, hexamethylenebis-10-glycidylstearate, hexamethylenebis-9,10-diglycidylstearate, p-xylylenebis-9,10-diglycidylstearate, p-xylylenebis-11,12-diglycidyistearate. Of those, a carboxylic acid amide substituted with a hydroxy group such as ethylenebis-12-hydroxystearic acid amide, hexamethylenebis-10-hydroxystearic acid amide, hexamethylenebis-9,10-dihydroxystearic acid amide, p-xylylenebis-11,12-dihydroxystearic acid amide, and p-xylylenebis-9,10-dihydroxystearic acid amide are preferred from the viewpoint of improvement of a crystallization rate of the polylactic acid resin. Further, a carboxylic acid bisamide each having 2 or more and 8 or less methylene groups or 1 or more and 4 or less phenyl group(s) between two amides bonding, and having 3 or more and 6 or less hydroxy substituents such as hexamethylenebis-9,10-dihydroxystearic acid amide, p-xylylenebis-11,12-dihydroxystearic acid amide, and p-xylylenebis-9,10-dihydroxystearic acid amide are particularly preferred.

Further, the melting points of the carboxylic acid amide and the carboxylic acid ester each of which has a polar group at a specific site in a molecule are preferably 20 to 300° C. When the melting point of each of the compounds is lower than 20° C., the compounds may bleed out from the molded article and an exterior appearance of the molded article tends to be deteriorated. On the other hand, when the melting point thereof exceeds 300° C., it becomes difficult to melt the compounds under a general molding processing conditions, and thus a molding processability thereof tends to be decreased.

In the polylactic acid resin composition of the present invention, a content of the organic crystal nucleating agent which has a polar group at a specific site in a molecule is preferably 0.1 to 5 parts by mass with respect to 100 parts by mass of the polylactic acid resin. When the content of the organic crystal nucleating agent which has a polar group is less than 0.1 part by mass, a degree of increase in crystallization rate tends to become insufficient. On the other hand, when the content thereof exceeds 5 parts by mass, a thermoplastic function of the composition comes to be expressed excessively strongly, which may lead to the tendencies that the rigidity of the composition decreases, the composition bleeds out from the molded article, and an exterior appearance of the molded article is deteriorated being remarkable. More preferably, the content is 0.5 to 3 parts by mass. When the content of the organic crystal nucleating agent which has a polar group is in the above range, the moldability and the state of exterior appearance after molding is further satisfactory.

In the present invention, when at least one of the carboxylic acid amide and the carboxylic acid ester each of which is the low molecular compound having a polar group in a molecule, and the (meth)acrylate compound are both added to the polylactic acid resin, the moldability of the polylactic acid resin is extremely improved compared with the case where one of the carboxylic acid amide or the carboxylic acid ester and the (meth)acrylate compound is used alone. It is considered that the mechanism which promotes the crystallization to one of the both compounds differs from that to the other compounds. It is also considered that the total crystallization rate is increased as a result of an unexpected multiplier effect of the both, and thus leading to a shortened molding cycle and to the improvement in moldability such that poses no problems in extracting the molded article even in the same molding cycle. In addition, as a result, the heat resistance is also increased.

The polylactic acid resin composition of the present invention can increase its mechanical properties and heat resistance by including a reactive compound containing at least 1 unit or more of a functional group selected from the group consisting of an epoxy, an isocyanate, an oxazoline, a carbodiimide, an acid anhydride, and an alkoxysilane. 0.01 to 5 parts by mass of the reactive compound is preferably contained with respect to 100 parts by mass of the polylactic acid resin.

Of the above reactive compounds, as a compound having an epoxy group, there are exemplified various glycidyl ethers and various glycidyl esters, such as a glycidyl methacrylate-methyl methacrylate copolymer, a glycidyl methacrylate-styrene copolymer, polyethyleneglycol diglycidyl ether, trimethylolpropane polyglycidyl ether, coconut fatty acid glycidyl ester, an epoxidized soybean oil, and an epoxidized linseed oil. In addition, examples of a compound having an isocyanate group include hexamethylene diisocyanate, tolylene diisocyanate, and diphenylmethane diisocyanate.

In addition, specific examples of the oxazoline compound include 2-methoxy-2-oxazoline, 2-ethoxy-2-oxazoline, 2-propoxy-2-oxazoline, 2,2'-m-phenylenebis(2-oxazoline), 2,2'-tetramethylenebis(2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4'-dimethyl-2-oxazoline), and 2,2'-diphenylenebis(2-oxazoline). Further, polyoxazoline compound containing the above compound as a monomer unit, such as a styrene-2-isopropenyl-2-oxazoline copolymer is exemplified. Of those oxazoline compounds, one kind or two or more kinds of compounds can be arbitrarily selected. 2,2'-m-phenylenebis(2-oxazoline) and 2,2'-p-phenylenebis(2-oxazoline) are preferred from the viewpoint of heat resistance, reactivity, and compatibility with a biodegradable polyester resin.

In addition, specific examples of the carbodiimide compound include N,N'-di-2,6-diisopropylphenylcarbodiimide, N,N'-di-o-tolylcarbodiimide, N,N'-di-2-isobutyl-6-isopropylphenylcarbodiimide, N,N'-di-2,4,6-trimethylphenylcarbodiimide, N,N'-di-2,4,6-triisopropylphenylcarbodiimide, N,N'-di-2,4,6-triisobutylphenylcarbodiimide, diisopylcarbodiimide, dimethylcarbodiimide, diisobutylcarbodiimide, dioctylcarbodiimide, t-butylisopropylcarbodiimide, di-β-naphthylcarbodiimide, di-t-butylcarbodiimide, aromatic polycarbodiimides, and polymers thereof. Those may be used alone or two or more kinds thereof may be used in combination. In the present invention, aromatic carbodiimides, in particular, N,N'-di-2,6-diisopropylphenylcarbodiimide and polymers thereof (having preferably polymerization degree of about 2 to 20) are desirably used. In addition, an carbodiimide compound having a cyclohexane ring, in particular, 4,4'-dicyclohexylmethanecarbodiimide and polymers thereof (having preferably polymerization degree of about 2 to 20) is particularly preferably used.

Examples of a compound containing an acid anhydride include trimellitic anhydride, pyromellitic anhydride, an ethylene-maleic anhydride copolymer, a methylvinyl ether-maleic anhydride copolymer and a styrene-maleic anhydride copolymer.

As a compound containing an alkoxysilane, various alkyltrialkoxysilanes are used. As an alkoxy group, a methoxy group and an ethoxy group are suitably used, and as an alkyl group, an alkyl group substituted with a glycidyl group and isocyanate group are suitably used. Specific examples of the compound include glycidoxypropyltrimethoxysilane, glycidoxypropyltriethoxysilane, isocyanatepropyltriethoxysilane, methacryloxypropylmethyltrimethoxysilane, acryloxypropylmethyltrimethoxysilane and olygomers obtained by subjecting those compounds to dehydrating condensation.

As the method for the polylactic acid resin to include the reactive compound, there are a method of mixing the reactive compound with the resin beforehand and then reacting them, and a method of mixing the reactive compound simultaneously with the resin in the same process as the compound to be described below and reacting them, and any of those methods may be employed. Further, it is preferable that, in the case where the alkoxysilane is added at the time of melt-kneading, alcohol generated by the reaction be removed from a vent port under reduced pressure.

A content of those reactive compounds in the polylactic acid resin is preferably 0.1 to 5 parts by mass, more preferably 0.2 to 3 parts by mass, and still more preferably 0.3 to 2 parts by mass with respect to 100 parts by mass of the polylactic acid resin.

Further, the polylactic acid resin composition of the present invention can be imparted with increased heat resistance by further including a fiber. In the case where the fiber is used, a content thereof is preferably 150 to 5 parts by mass with respect to 100 parts by mass of the polylactic acid resin of the present invention, because the impact resistance and the moldability of the composition are particularly excellent, and is particularly preferably 100 to 5 parts by mass.

As the fiber according to the present invention, plant fibers, such as a kenaf, synthetic organic fibers such as an aramid fiber and a whole aromatic polyester fiber, and inorganic fibers, such as a glass fiber and a metal fiber can be used. One kind thereof may be used alone, two or more kinds thereof may be used in mixture, or different kinds of fibers may be used in mixture.

The plant fiber used for the present invention is a fiber derived from a plant, and specific examples thereof include fibers obtained from wood, kenaf, bamboo, and hemps. Those fibers preferably have an average fiber length of 20 mm or less. Further, pulp and the like which can be obtained by subjecting those plant fibers to delignification or depectination are particularly preferable, because degradation thereof, such as decomposition and discoloration due to heat is small. The kenaf and the bamboo each have high photosynthesis rate and the growth thereof is fast, so they can absorb a large amount of carbon dioxide, therefore they are excellent as one of the means to simultaneously solve the Earth problems of global warming caused by carbon dioxide and deforestation. Thus, the kenaf and the bamboo are preferable among the plant fibers.

As the synthetic organic fiber according to the present invention, polyamide fibers such as an aramid fiber and nylon fiber, polyester fibers, such as a polyarylate fiber and a polyethylene terephthalate fiber, an ultrahigh strength polyethylene fiber, a polypropylene fiber and the like are mentioned.

The aramid fiber and the polyarylate fiber are aromatic compounds, and are particulary desirable, because they have high heat resistance and high strength compared with other fibers, are pale in color and thus do not degrade design when added to the resin, and have low specific gravity.

As the inorganic fiber according to the present invention, a carbon fiber, a metal fiber, a glass fiber, metal silicate, an inorganic oxide fiber, an inorganic nitride fiber, and the like are mentioned.

A shape of each of the above fibers, in its cross-section, is not circular, but is polygonal, amorphous, or convexo-concave. The shape which has a high aspect ratio and a small fiber diameter is desirable from the viewpoint that a junction area of the fiber with the resin becomes larger.

Further, each of the fibers may be subjected to surface treatment as needed in order to increase affinity with the resin to be a base material or to increase entanglement between the fibers. As surface treatment methods, a treatment by coupling agents such as silane-based and titanate-based, an ozone treatment or a plasma treatment, a treatment by an alkylphosphate type surfactant, and the like are effective. However, the treatment method is not particularly limited to those, and generally used treatment methods for surface improvement of the filler can be used.

In each of the fibers above, an average fiber length before being mixed with the polylactic acid resin is preferably 100 µm to 20 mm, and it is particularly effective when the length is in a range of 100 µm to 10 mm. Further, an average fiber length after being kneaded is preferably 80 µm to 3 mm.

The combined use of each of those fibers further suppresses a decrease in the melt tension of the resin, which brings about an increase in crystallization rate and an additional improvement in moldability, and in addition, the heat resistance under high-load condition is significantly increased owing to a reinforcement effect of the fiber.

Other than the above, the polylactic acid resin composition of the present invention may be added with a pigment, a heat stabilizer, an antioxidant, a weathering agent, a flame retardant, a plasticizer, a lubricant, a mold releasing agent, an antistat, a filler, a crystal nucleating agent, an antibacterial agent, and a fungicide, as needed. Examples of the heat stabilizer and the antioxidant include hindered phonols, phosphorus compounds, hindered amine, sulfur compounds, copper compounds, and halides of alikali metals. As the flame retardant, a halogen flame retardant, a phosphorus flame retardant, and an inorganic flame retardant may be used, but when considering the environment, a non-halogen flame retardant is preferably used. Examples of the non-halogen flame retardant include a phosphorus flame retardant, hydrated metal compounds (aluminum hydroxide, magnesium hydroxide), nitrogen-containing compounds (melamine-based, guanidine-based), and inorganic compounds (borate, molybdenum compound). As inorganic fillers, talc, calcium carbonate, zinc carbonate, silica, alumina, magnesium oxide, calcium silicate, sodium aluminate, calcium aluminate, sodium aluminosilicate, magnesium silicate, glass balloons, carbon black, zinc oxide, antimony trioxide, zeolites, hydrotalcite, boron nitride, potassium titanate, graphite, and the like are mentioned. As organic fillers, naturally-occurring polymers such as starch, cellulose fine particles, wood powders, bean curd refuse, rice husk, and bran, and modified products thereof are mentioned. As inorganic crystal nucleating agents, talc, kaoline, and the like are mentioned, and as organic crystal nucleating agents, sorbitol compounds, metal salts of benzoic acid and a compound thereof, phosphate metal salts, rosin compounds, and the like are mentioned. Examples of the antibacterial agent that can be used include silver ions, copper ions, and zeolite including those. Note that a method of compounding those with the polylactic acid resin composition of the present invention is not particularly limited.

The resin composition of the present invention may increase the heat resistance thereof by promoting crystallization. As a method therefor, a method of promoting crystallization by cooling the resin in the mold at the time of injection molding can be exemplified. In this case, it is preferable that a mold temperature be retained at a glass transition temperature of the polylactic acid resin (Tg) plus 20° C. or higher and a melting point thereof (Tm) minus 20° C. or lower for a predetermined period of time, and then cooled to Tg or lower. Further, as a method of promoting crystallization after the molding, it is preferable that, after directly cooling the resin at the mold temperature of Tg or lower, the resin be subjected again to the heat treatment at Tg or higher and Tm minus 20° C. or lower. As a result, the heat resistance of the molded article is increased, deflection temperature under load (DTUL) under a low-load condition (0.45 MPa) is Tg plus 30° C. or higher, and in the system to which the fiber was added, the DTUL under a high-load condition (1.8 MPa) is Tg plus 20° C. or higher.

As methods of mixing various compounding components of the polylactic acid resin composition according to present invention is not particularly limited, and mixing by known mixers such as a tumbler, a ribbon blender, and an uniaxial or biaxial kneader, and melt-mixing by an extruder, a roller, and the like are mentioned. At that time, the combined use of a static mixer or a dynamic mixer may is effective. It is preferable to use a biaxial extruder in order to enhance the kneading state.

The molded article of the present invention is formed by molding the polylactic acid resin composite material of the present invention.

The polylactic acid resin composition of the present invention may be processed into molded articles of, for example, electrical and electronic equipment applications such as a casing of electric appliances, architectural material applications, automobile parts applications, household product applications, health-care applications, agriculture applications, and the like, by using methods such as an injection molding method, a blow molding method, a film molding method, and a foam molding method.

The molded article of the present invention is not particularly limited in its shape, thickness, and the like, and may be any of an injection molded product, an extrusion molded product, a compression molded product, a blow molded product, a sheet, a film, a yarn, a fabric, and the like. More specifically, housings of electrical and electronic appliances, films for product packagings, various containers, automobile parts, and the like are mentioned. Further, in the case where the molded article of the present invention is used as a sheet, the molded article may be laminated with paper or another polymer sheet, so as to be used as a multi-layered laminate.

The method of molding the polylactic acid resin composition of the present invention is not particularly limited, and a known injection molding method, injection/compression molding method, compression molding method, or the like, which is a general molding method required for manufacturing electrical and electronic equipment, can be used. As for a temperature at the time of melt-mixing or molding, there may be set a range which is equal to or higher than the melting temperature of the resin to be a base material, and in which the plant fiber or the polylactic acid resin is not thermally deteriorated. On the other hand, the mold temperature is preferably Tm of the polylactic acid resin composition minus 20° C. or lower. In the case of promoting crystallization in the mold in order to increase the heat resistance of the polylactic acid resin composition, it is preferable that the mold temperature be retained at Tg plus 20° C. or higher and Tm minus 20° C. or lower for a predetermined period of time, and then cooled to Tg or lower. On the contrary, in the case of promoting crystallization afterwards, it is preferable that, after directly cooling the resin composition to Tg or lower, the resin composition be subjected again to the heat treatment at Tg or higher and Tm minus 20° C. or lower.

EXAMPLE

An evaluation method of the moldability according to Examples and Comparative Examples of the present invention is shown.

Hereinafter, the present invention is described more specifically by way of Examples. Measuring methods used for the evaluation of the resin compositions of Examples and Comparative Examples are as follows.

(1) Melt Flow Rate (MFR)

The melt flow rate was measured according to JIS standard K-7210 (condition D of Table 1, Appendix A) at 190° C. under a load of 21.2 N.

(2) Moldability

The resin compositions obtained in Examples and Comparative Examples were molded by using injection molding machine (IS-80G, manufactured by TOSHIBA MACHINE CO., LTD.) (cylinder temperature: preset at 185° C., actual measurement temperature of mold: 85° C. and 105° C.), to thereby obtain test pieces. As for the moldability, retention time (cooling time) at inside the mold required for taking out the test pieces which have no warp or shrinkage was measured, and the measurement was used as an index of the moldability.

(3) Flexural Strength, Flexural Elastic Modulus

The flexural strength and the flexural elastic modulus were measured in accordance with ISO 178.

(4) Charpy Impact Strength

The Charpy impact strength was measured in accordance with ISO 179.

(5) Heat Resistance (° C.)

In accordance with ISO 75, deflection temperatures under load were measured for a load of 0.45 MPa and a load of 1.8 MPa.

(6) Fiber Length in Resin After Kneading

In the system to which the fiber was added, 1 g of the molded article of the polylactic acid resin composition was dissolved in 50 ml of chloroform, followed by performing filtration by using 1,480 mesh stainless steel net and measuring length of the fibers which were in a field of vision when observed by using an optical microscope, thereby calculating a number average length.

(7) Humidity-heat Resistance

After the flexural strength test piece was subjected to a treatment for 200 hours at 60° C. under humidity of 90% RH, flexural strength was measured, and strength retention rate was calculated, and evaluated. The strength retention rate preferably exceeds 90%.

Note that materials and auxiliary materials used in Examples and Comparative Examples are as shown in Table 1.

TABLE 1

| Resin | Resin A | Polylactic acid (weight-average molecular weight: 200,000, L-lactic acid: 99%, D-lactic acid: 1%, melting point: 168° C., MFR: 3 g/10 minutes) |
|---|---|---|
| | Resin B | Polylactic acid (weight-average molecular weight: 130,000, L-lactic acid: 99%, D-lactic acid: 1%, melting point: 168° C., MFR: 8 g/10 minutes) |
| | Resin C | Copolymer of polylactic acid and aliphatic polyester (Plamate PD150, manufactured by Dainippon Ink and Chemicals Incorporated) |
| Organic nucleating agent | | Ethylenebis-12-hydroxystearic acid amide (EBHSA, manufactured by ITOH OIL CHEMICALS CO., LTD.) |
| | | Ethylenebisstearic acid amide (EBSA, manufactured by ITOH OIL CHEMICALS CO., LTD.) |
| | | Hexamethylenebis-9,10-dihydroxystearic acid amide (HMBSHA, manufactured by ITOH OIL CHEMICALS CO., LTD.) |
| (Meth)acrylate compound | | PEGDM: Polyethyleneglycol dimethacrylate (manufactured by NOF CORPORATION) |
| Additive I | | Di-t-butyl peroxide (DBPO, manufactured by NOF CORPORATION) |
| Terminal blocking agent | | LA-1: Polycyclohexylcarbodiimide (LA-1, manufactured by Nisshinbo Industries, Inc.) |
| Fiber | | Kenaf (average fiber length: 3 mm) |

Example 1

<Preparation of Polylactic Acid Resin Composition>

3 parts by mass of ethylenebis-12-hydroxystearic acid amide and 1 part by mass of a (meth)acrylate compound are melt-kneaded in 100 parts by mass of Resin A by using a biaxial extruder (TEM-37BS, manufactured by TOSHIBA MACHINE CO., LTD.) under conditions of barrel temperature: 190° C., rotational frequency of screw: 200 rpm, and discharge: 15 kg/h, whereby pellets of polylactic acid resin composition were obtained. The pellets were subjected to molding by the above-mentioned injection molding machine and the moldability was valued.

Examples 2 to 10

The polylactic acid resin compositions were prepared similarly as in Example 1 except that the additives were changed as shown in Tables 2 and 3 below, and the moldability was evaluated.

Comparative Example 1

Resin A was subjected to molding without adding any compounds by using the same injection molding machine as Example 1, but the test piece in each condition greatly deformed, and thus no test piece could be obtained.

Comparative Examples 2 to 9

The polylactic acid resin compositions were prepared similarly as in Example 1 except that the additives were changed as shown in Tables 4 and 5, and the moldabilities thereof were evaluated.

The results of evaluation of various physical properties are collectively shown in Tables 2, 3, 4, and 5 below.

The resin compositions obtained in Examples 1 to 10 were excellent in moldability, flexural properties, impact resistance, and heat resistance. Only the resin composition obtained in Example 10 had an excellent result in humidity-heat resistance.

Comparative Examples 2, 3, and 4 were not compounded with the (meth)acrylate compound, and thus were inferior in moldability.

Comparative Examples 5, 6, 7, and 9 were not compounded with EBHSA and/or HMBHSA, and thus were inferior in moldability.

Comparative Example 8 was not compounded with EBHSA and/or HMBHSA, and the (meth)acrylate compound, and thus was inferior in moldability.

TABLE 2

| | | | Example 1 | Example 2 | Example 3 | Example 4 | Example 5 |
|---|---|---|---|---|---|---|---|
| Composition | Resin | A (part(s) by mass) | 100 | — | — | — | — |
| | | B (part(s) by mass) | — | 100 | 100 | 100 | 100 |
| | | C (part(s) by mass) | — | — | — | — | — |
| | Organic nucleating agent | EBHSA (part(s) by mass) | 3 | 3 | 3 | 3 | 3 |
| | | HMBHSA (part(s) by mass) | — | — | — | — | — |
| | (Meth)acrylate compound | PEGDM (part(s) by mass) | 0.1 | 0.1 | 0.2 | 0.1 | 0.1 |
| | Additive I | DBPO (part(s) by mass) | — | 0.2 | 0.4 | 0.2 | 0.2 |
| | Fiber | Kenaf (part(s) by mass) | — | — | — | 10 | 20 |
| | Terminal blocking agent | LA-1 (part(s) by mass) | — | — | — | — | — |
| Average length of fiber in resin after kneading (mm) | | | — | — | — | 1.5 | 1.5 |
| Physical properties | Moldability | Cooling time (second(s), mold: 85° C.) | 75 | 65 | 60 | 60 | 55 |
| | | Cooling time (second(s), mold: 105° C.) | 50 | 50 | 45 | 45 | 40 |
| | Flexural properties | Flexural strength (MPa) | 98 | 101 | 106 | 132 | 143 |
| | | Flexural elastic modulus (GPa) | 4.1 | 4.1 | 4.3 | 5.6 | 6.8 |
| | Impact resistance | Charpy impact strength (kJ/m$^2$) | 2.1 | 2.1 | 2.0 | 2.3 | 2.7 |
| | Heat resistance | DTUL (° C., load: 0.45 MPa) | 121 | 122 | 121 | 128 | 148 |
| | | DTUL (° C., load: 1.8 MPa) | 66 | 65 | 65 | 105 | 116 |
| | Humidity-heat resistance | Strength retention rate (%) | 50 | 56 | 54 | 46 | 42 |

TABLE 3

| | | | Example 6 | Example 7 | Example 8 | Example 9 | Example 10 |
|---|---|---|---|---|---|---|---|
| Composition | Resin | A (part(s) by mass) | — | — | — | — | — |
| | | B (part(s) by mass) | 100 | 80 | 80 | 80 | 100 |
| | | C (part(s) by mass) | — | 20 | 20 | 20 | — |
| | Organic nucleating agent | EBHSA (part(s) by mass) | — | 3 | — | 3 | 3 |
| | | HMBHSA (part(s) by mass) | 3 | — | 3 | — | — |
| | (Meth)acrylate compound | PEGDM (part(s) by mass) | 0.1 | 0.1 | 0.1 | 0.1 | 0.1 |
| | Additive I | DBPO (part(s) by mass) | 0.2 | 0.2 | 0.2 | 0.2 | 0.2 |
| | Fiber | Kenaf (part(s) by mass) | 20 | — | — | 20 | 20 |
| | Terminal blocking agent | LA-1 (part(s) by mass) | — | — | — | — | 2 |
| Average length of fiber in resin after kneading (mm) | | | 1.5 | — | — | 1.5 | 1.5 |
| Physical properties | Moldability | Cooling time (second(s), mold: 85° C.) | 55 | 70 | 70 | 60 | 55 |
| | | Cooling time (second(s), mold: 105° C.) | 40 | 55 | 55 | 45 | 40 |
| | Flexural properties | Flexural strength (MPa) | 141 | 76 | 75 | 112 | 145 |
| | | Flexural elastic modulus (GPa) | 6.8 | 3.1 | 3.0 | 4.6 | 6.5 |
| | Impact resistance | Charpy impact strength (kJ/m$^2$) | 2.6 | 3.1 | 3.1 | 3.4 | 2.8 |
| | Heat resistance | DTUL (° C., load: 0.45 MPa) | 146 | 114 | 113 | 135 | 147 |
| | | DTUL (° C., load: 1.8 MPa) | 115 | 64 | 63 | 106 | 115 |
| | Humidity-heat resistance | Strength retention rate (%) | 44 | 52 | 53 | 41 | 93 |

TABLE 4

| | | | Comparative Example 1 | Comparative Example 2 | Comparative Example 3 | Comparative Example 4 | Comparative Example 5 |
|---|---|---|---|---|---|---|---|
| Composition | Resin | A (part(s) by mass) | 100 | 100 | — | — | — |
| | | B (part(s) by mass) | — | — | 100 | 80 | 100 |
| | | C (part(s) by mass) | — | — | — | 20 | — |
| | Organic nucleating agent | EBHSA (part(s) by mass) | — | 3 | 3 | — | — |
| | | HMBHSA (part(s) by mass) | — | — | — | 3 | — |
| | | EBSA (part(s) by mass) | — | — | — | — | — |
| | (Meth)acrylate compound | PEGDM (part(s) by mass) | — | — | — | — | 0.1 |
| | Additive I | DBPO (part(s) by mass) | — | — | — | — | — |
| | Fiber | Kenaf (part(s) by mass) | — | — | — | — | — |

TABLE 4-continued

|  |  |  | Comparative Example 1 | Comparative Example 2 | Comparative Example 3 | Comparative Example 4 | Comparative Example 5 |
|---|---|---|---|---|---|---|---|
| Average length of fiber in resin after kneading (mm) |  |  | — | — | — | — | — |
| Physical properties | Moldability | Cooling time (second(s), mold: 85° C.) | not moldable | 150 | 150 | 150 | 140 |
|  |  | Cooling time (second(s), mold: 105° C.) | not moldable | 90 | 90 | 90 | 85 |
|  | Flexural properties | Flexural strength (MPa) | — | 96 | 96 | 74 | 100 |
|  |  | Flexural elastic modulus (GPa) | — | 4.0 | 4.1 | 3.0 | 4.2 |
|  | Impact resistance | Charpy impact strength (kJ/m$^2$) | — | 1.8 | 1.9 | 3.1 | 2.2 |
|  | Heat resistance | DTUL (° C., load: 0.45 MPa) | — | 117 | 116 | 112 | 119 |
|  |  | DTUL (° C., load: 1.8 MPa) | — | 62 | 62 | 62 | 65 |
|  | Humidity-heat resistance | Strength retention rate (%) | — | 51 | 52 | 52 | 52 |

TABLE 5

|  |  |  | Comparative Example 6 | Comparative Example 7 | Comparative Example 8 | Comparative Example 9 |
|---|---|---|---|---|---|---|
| Composition | Resin | A (part(s) by mass) | — | — | — | — |
|  |  | B (part(s) by mass) | 100 | 100 | 100 | 100 |
|  |  | C (part(s) by mass) | — | — | — | — |
|  | Organic nucleating agent | EBHSA (part(s) by mass) | — | — | — | — |
|  |  | HMBHSA (part(s) by mass) | — | — | — | — |
|  |  | EBSA (part(s) by mass) | — | — | 3 | 3 |
|  | (Meth)acrylate compound | PEGDM (part(s) by mass) | 0.1 | 0.1 | — | 0.1 |
|  | Additive I | DBPO (part(s) by mass) | 0.2 | 0.2 | — | 0.2 |
|  | Fiber | Kenaf (part(s) by mass) | — | 20 | — | — |
| Average length of fiber in resin after kneading (mm) |  |  | — | 1.5 | — | — |
| Physical properties | Moldability | Cooling time (second(s), mold: 85° C.) | 140 | 120 | 155 | 140 |
|  |  | Cooling time (second(s), mold: 105° C.) | 85 | 80 | 95 | 85 |
|  | Flexural properties | Flexural strength (MPa) | 103 | 144 | 105 | 104 |
|  |  | Flexural elastic modulus (GPa) | 4.3 | 6.8 | 4.7 | 4.5 |
|  | Impact resistance | Charpy impact strength (kJ/m$^2$) | 2.1 | 2.5 | 2.0 | 2.1 |
|  | Heat resistance | DTUL (° C., load: 0.45 MPa) | 120 | 150 | 121 | 122 |
|  |  | DTUL (° C., load: 1.8 MPa) | 63 | 118 | 64 | 64 |
|  | Humidity-heat resistance | Strength retention rate (%) | 50 | 44 | 50 | 48 |

Industrial Applicability

As described above, the polylactic acid resin composition of the present invention is applicable to the molded articles of electrical and electronic equipment applications, architectural material applications, automobile parts applications, household product applications, health-care applications, agriculture applications, toys/amusement applications, and the like, by using methods such as an injection molding method, a film molding method, a blow molding method, and a foam molding method.

The invention claimed is:

1. A polylactic acid resin composition, comprising:
  (a) a polylactic acid resin reacted with a (meth)acrylate compound; and
  (b) an organic crystal nucleating agent comprising at least one kind of low molecular weight compound;
  wherein,
  said (meth)acrylate compound is present as 0.01 to 20 parts by mass with respect to 100 parts by mass of the polylactic acid resin,
  said at least one kind of low molecular weight compound is present as 0.5 to 5 parts by mass with respect to 100 parts by mass of the polylactic acid resin,
  said (meth)acrylate compound is selected from the group consisting of: glycidyl methacrylate, glycidyl acrylate, glycerol dimethacrylate, trimethylolpropane trimethacrylate, trimethylolpropane triacrylate, allyloxypolyethylene glycol monoacrylate, allyloxypolyethylene glycol monomethacrylate, polyethylene glycol dimethacrylate, polyethylene glycol diacrylate, polypropylene glycoldimethacrylate, polypropylene glycol diacrylate, polytetramethylene glycol dimethacrylate butanediol methacrylate, and butanediol acrylate, and
  said low molecular weight compound is selected from the group consisting of: ethylenebis-12-glycidylstearic acid amide, hexamethylenebis-10-glycidylstearic acid amide, hexamethylenebis-9,10-diglycidylstearic acid amide, p-xylylenebis-9,10-diglycidylstearic acid amide, p-xylylenebis-11,12-diglycidylstearic acid amide, ethylenebis-12-hydroxystearate, hexamethylenebis-10-hydroxystearate, hexamethylenebis-9,10-dihydroxystearate, p-xylylenebis-9,10-dihydroxystearate, p-xylylenebis-11,12-dihydroxystearate, ethylenebis-12-aminostearate, hexamethylenebis-10-aminostearate, hexamethylenebis-9,10-diaminostearate, p-xylylenebis-9,10-diaminostearate, p-xylylenebis-11,12-diaminostearate, ethylenebis-12-cyanostearate, hexamethylenebis-10-cyanostearate, hexamethylenebis-9,10-dicyanostearate, p-xylylenebis-9,10-dicyanostearate, p-xylylenebis-11,12-dicyanostearate, ethylenebis-12-glycidylstearate, hexamethylenebis-10-glycidylstearate, hexamethylenebis-9,10-diglycidylstearate, p-xylylenebis-9,10-diglycidylstearate and p-xylylenebis-11,12-diglycidylstearate.

2. The polylactic acid resin composition according to claim 1, wherein the polylactic acid resin composition further comprises 100 parts by mass or less of fiber with respect to 100 parts by mass of the polylactic acid resin.

3. The polylactic acid resin composition according to claim 2, wherein the fiber has an average fiber length of 80 μm to 3 mm after being mixed with the polylactic acid resin.

4. A polylactic acid resin molded article, which is obtained by molding a polylactic acid resin composition, said polylactic acid resin composition having a moldability such that cooling time is within a range of between 40 to 75 seconds, the polylactic acid resin composition comprising:
   (a) a polylactic acid resin reacted with a (meth)acrylate compound; and
   (b) an organic crystal nucleating agent comprising at least one kind of low molecular weight compound;
   wherein,
   said (meth)acrylate compound is present as 0.01 to 20 parts by mass with respect to 100 parts by mass of the polylactic acid resin,
   said at least one kind of low molecular weight compound is present as 0.5 to 5 parts by mass with respect to 100 parts by mass of the polylactic acid resin,
   said (meth)acrylate compound is selected from the group consisting of: glycidyl methacrylate, glycidyl acrylate, glycerol dimethacrylate, trimethylolpropane trimethacrylate, trimethylolpropane triacrylate, allyloxypolyethylene glycol monoacrylate, allyloxypolyethylene glycol monomethacrylate, polyethylene glycol dimethacrylate, polyethylene glycol diacrylate, polypropylene glycoldimethacrylate, polypropylene glycol diacrylate, polytetramethylene glycol dimethacrylate, butanediol methacrylate, and butanediol acrylate, and
   said low molecular weight compound is selected from the group consisting of: ethylenebis-12-glycidylstearic acid amide, hexamethylenebis-10-glycidylstearic acid amide, hexamethylenebis-9,10-diglycidyl stearic acid amide, p-xylylenebis-9,10-diglycidylstearic acid amide, p-xylylenebis-11,12-diglycidylstearic acid amide, ethylenebis-12-hydroxystearate, hexamethylenebis-10-hydroxystearate, hexamethylenebis-9,10-dihydroxystearate, p-xylylenebis-9,10-dihydroxystearate, p-xylylenebis-11,12-dihydroxystearate, ethylenebis-12-aminostearate, hexamethylenebis-10-aminostearate, hexamethylenebis-9,10-diaminostearate, p-xylylenebis-9,10-diaminostearate, p-xylylenebis-11,12-diaminostearate, ethylenebis-12-cyanostearate, hexamethylenebis-10-cyanostearate, hexamethylenebis-9,10-dicyanostearate, p-xylylenebis-9,10-dicyanostearate, p-xylylenebis-11,12-dicyanostearate, ethylenebis-12-glycidylstearate, hexamethylenebis-10-glycidylstearate, hexamethylenebis-9,10-diglycidylstearate, p-xylylenebis-9,10-diglycidylstearate and p-xylylenebis-11,12-diglycidylstearate.

5. The polylactic acid resin molded article according to claim 4, wherein the polylactic acid resin composition further comprises 100 parts by mass or less of fiber with respect to 100 parts by mass of the polylactic acid resin.

6. The polylactic acid resin molded article according to claim 5, wherein the fiber has an average fiber length of 80 μm to 3 mm after being mixed with the polylactic acid resin.

7. A method of manufacturing a polylactic acid resin molded article, comprising setting a mold temperature to a glass transition temperature of a polylactic acid resin plus 20° C. or higher and a melting point thereof minus 20° C. or lower, at the time of injection molding a polylactic acid resin composition comprising (a) a polylactic acid resin reacted with a (meth)acrylate compound, and (b) an organic crystal nucleating agent comprising at least one kind of low molecular weight compound, said polylactic acid resin composition having a moldability such that cooling time is within a range between 40 and 75 seconds,
   wherein,
   said (meth)acrylate compound is present as 0.01 to 20 parts by mass with respect to 100 parts by mass of the polylactic acid resin,
   said at least one kind of low molecular weight compound is present as 0.5 to 5 parts by mass with respect to 100 parts by mass of the polylactic acid resin,
   said (meth)acrylate compound is selected from the group consisting of: glycidyl methacrylate, glycidyl acrylate, glycerol dimethacrylate, trimethylolpropane trimethacrylate, trimethylolpropane triacrylate, allyloxypolyethylene glycol monoacrylate, allyloxypolyethylene glycol monomethacrylate, polyethylene glycol dimethacrylate, polyethylene glycol diacrylate, polypropylene glycoldimethacrylate, polypropylene glycol diacrylate, polytetramethylene glycol dimethacrylate, butanediol methacrylate, and butanediol acrylate, and
   said low molecular compounds are selected from the group consisting of: p-xylylenebis-11,12-dicyanostearic acid amide, ethylenebis-12-glycidylstearic acid amide, hexamethylenebis-10-glycidylstearic acid amide, hexamethylenebis-9,10-diglycidyl stearic acid amide, p-xylylenebis-9,10-diglycidylstearic acid amide, p-xylylenebis-11,12-diglycidylstearic acid amide, ethylenebis-12-hydroxystearate, hexamethylenebis-10-hydroxystearate, hexamethylenebis-9,10-dihydroxystearate, p-xylylenebis-9,10-dihydroxystearate, p-xylylenebis-11,12-dihydroxystearate, ethylenebis-12-aminostearate, hexamethylenebis-10-aminostearate, hexamethylenebis-9,10-diaminostearate, p-xylylenebis-9,10-diaminostearate, p-xylylenebis-11,12-diaminostearate, ethylenebis-12-cyanostearate, hexamethylenebis-10-cyanostearate, hexamethylenebis-9,10-dicyanostearate, p-xylylenebis-9,10-dicyanostearate, p-xylylenebis-11,12-dicyanostearate, ethylenebis-12-glycidylstearate, hexamethylenebis-10-glycidylstearate, hexamethylenebis-9,10-diglycidylstearate, p-xylylenebis-9,10-diglycidylstearate and p-xylylenebis-11,12-diglycidylstearate.

8. The method of manufacturing a polylactic acid resin molded article according to claim 7, wherein the polylactic acid resin composition further comprises 100 parts by mass or less of the fiber with respect to 100 parts by mass of the polylactic acid resin.

9. The method of manufacturing a polylactic acid resin molded article according to claim 8, wherein the fiber has an average fiber length of 80 μm to 3 mm after being mixed with the polylactic acid resin.

10. The polylactic acid resin composition according to claim 2, wherein the fiber is a metal silicate, an inorganic oxide fiber or an inorganic nitride fiber.

11. The polylactic acid resin molded article according to claim 5, wherein the fiber is a metal silicate, an inorganic oxide fiber or an inorganic nitride fiber.

12. The method of manufacturing a polylactic acid resin molded article according to claim 8, wherein the fiber is a metal silicate, an inorganic oxide fiber or an inorganic nitride fiber.

13. The polylactic acid resin composition according to claim 2, wherein the polylactic acid resin composition comprises 10-100 parts by mass of the fiber with respect to 100 parts by mass of the polylactic acid resin.

14. The polylactic acid resin composition according to claim 2, wherein the polylactic acid resin composition comprises 20-100 parts by mass of the fiber with respect to 100 parts by mass of the polylactic acid resin.

15. The polylactic acid resin composition according to claim 1, comprising poly(L-lactic acid), poly(D-lactic acid) or a mixture thereof, wherein one of the poly(L-lactic acid) and the poly(D-lactic acid) is present in an amount of 98 mol % or more before the mixture is reacted with the (meth)acrylate compound.

16. The polylactic acid resin composition according to claim 1, wherein the (meth)acrylate compound is polyethylene glycol dimethacrylate (PEGDM).

* * * * *